United States Patent [19]

Miskin

[11] 4,200,122
[45] Apr. 29, 1980

[54] THERMOSTAT CONTROL SOLENOID FOR LAWN WATERING

[76] Inventor: David M. Miskin, 8 Still La., West Hartford, Conn. 06117

[21] Appl. No.: 940,214

[22] Filed: Sep. 7, 1978

[51] Int. Cl.$^2$ ............................................. F16K 31/06
[52] U.S. Cl. ............................ 137/624.13; 137/624.15; 251/129
[58] Field of Search ............... 137/624.15, 624.14, 137/624.13, 604; 251/30, 335 A, 129

[56] References Cited

U.S. PATENT DOCUMENTS

| | | |
|---|---|---|
| 2,039,768 | 5/1936 | Bird . |
| 2,410,692 | 11/1946 | Strobell . |
| 2,444,471 | 7/1948 | Samiran ...................... 251/335 A X |
| 3,243,013 | 3/1966 | Molin .......................... 137/624.14 X |
| 3,244,372 | 4/1966 | Hanner . |
| 3,544,062 | 12/1970 | Murray ............................... 251/30 X |
| 3,672,391 | 6/1972 | Livingston .................. 137/624.15 X |
| 3,763,878 | 10/1973 | Harden ........................ 137/624.15 X |
| 3,865,138 | 2/1975 | Jones . |
| 3,963,376 | 6/1976 | Miskin . |
| 3,971,408 | 7/1976 | Simmons ............................. 137/604 |
| 4,029,299 | 6/1977 | Hechler ......................... 137/604 X |

Primary Examiner—Alan Cohan

[57] ABSTRACT

A solenoid-operated flow-control valve includes a solenoid coil that burns out if energized continuously. The energized solenoid permits fluid to flow, while fluid flow is prevented when the coil is not energized. A thermostat is interposed in the coil circuit and arranged in thermal communication with the coil. While fluid is being allowed to flow, the thermostat heats up until it causes the flow to be interrupted. It then cools down until it again allows fluid flow. A cycling flow of fluid thereby results.

A sticking thermostat fails safe because continuous energization of the coil causes it to burn out, thereby interrupting the flow of fluid.

8 Claims, 4 Drawing Figures

4,200,122

THERMOSTAT CONTROL SOLENOID FOR LAWN WATERING

BACKGROUND OF THE INVENTION

The invention described below relates to the field of automatic control of fluid flow, and it finds particular application in watering devices of the type used in lawn watering, gardening, and irrigation.

In the course of watering lawns and home gardens, the problem is often encountered that the soil is such that it cannot absorb enough water to properly support the desired plant life. That is, sandy soils retain very little water, allowing most of it to flow through, while clay soils cause much of the water to run off. The solution to this problem is to water in a very slow manner, thereby supplying only the amount of water that can be retained or absorbed by the soil.

In order to supply the water in this manner without constant human attention, devices have been employed in the past that automatically turn the water supply on and off, thereby providing water on a long-term basis but avoiding overwatering.

When such devices are intended for the home market, it is important that they be simple, inexpensive, and unlikely to cause damage to the lawn or garden with which they are used. An example of an attempt to fulfill these requirements is described in Jones, U.S. Pat. No. 3,865,138, in which a solenoid-actuated value is controlled by a timer. That arrangement is relatively simple, but certain improvements may be desired. For instance, the use of an ordinary timer of the type normally available to the consumer is geared to the twenty-four-hour day so that water can be turned off and on a very limited number of times in an entire day. If such a device is timed to stay on for the approximate amount of time required to supply as much water as the ground can take, it will typically be on for a very short time, will then be turned off, and for the rest of the day will permit the ground to dry out. What would be more desirable would be a provision of a large number of relatively short on times throughout a day. However, such an arrangement would not be feasible with the type of inexpensive timer normally available. In addition, the provision of a timer, even a relatively inexpensive one, does add significantly to the cost of what should be a low-priced item. Finally, if the timer used with the Jones arrangement should malfunction and permit continuous operation of the watering throughout the day, a good deal of irreversible damage could conceivably be done to the garden.

SUMMARY OF THE INVENTION

Accordingly, the present invention is an apparatus that can inexpensively control fluid flow, allow a large number of short periods of flow each day, and avoid the danger of overwatering.

According to the present invention, an automatically operated control valve includes a valve body including an inlet, an outlet and a flow passage providing fluid communication between the inlet and the outlet. A valve operating member is movably supported in the flow passage on the valve body for movement between an open position in which fluid is permitted to flow from the inlet to the outlet and a closed position in which fluid is prevented from flowing from the inlet to the outlet. Solenoid means are mounted on the valve body and include armature means movable between a first position and a second position. The armature means are operatively connected to the valve operating member for movement of the valve operating member between its closed and open positions when the armature means is operated between its first and second positions, respectively. The armature means is biased to the first position. The solenoid means also include coil means adjacent the armature means and operable upon current flowing through it in response to a potential difference applied across it to produce a magnetic field. The armature means is maintained in its second position by the magnetic field when a rated current flows through the coil. Thus, the valve operating member is maintained in the open position when the rated current flows through the coil means, and it is maintained in the closed position when no current flows through the coil means. Electric-circuit means adapted for application of a potential difference thereacross are electrically connected to the coil means for application of the potential difference across the coil means. Finally, thermostat means are electrically interposed in the circuit means to permit the application to the coil of potential difference applied across the circuit means when the temperature of the thermostat means is less than a predetermined minimum "off" temperature. The thermostat means prevent the application across the coil means of potential difference applied across the circuit means when the temperature of the thermostat means exceeds a predetermined maximum "on" temperature. The coil means is arranged in thermal communication with the thermostat means, the flow of current through the coil generating heat that is transferred to the thermostat means until it reaches a temperature that exceeds the maximum "on" temperature and the thermostat opens to prevent the application of the potential difference across the coil means. The thermostat means, upon cooling below the minimum "on" temperature when no current is flowing through the coil, closes to permit application of the potential difference across the coil means.

The valve body may include a valve seat in the flow passage that bounds an orifice through which fluid in the flow passage must flow to pass from the inlet to the outlet. The valve operating member would then include a valve disc having a seating surface shaped for seating on the valve seat and movable between a closed position in which it seats on the valve seat, thereby blocking the orifice and preventing flow of fluid therethrough, and an open position in which it is spaced from the valve seat, thereby permitting flow of fluid through the orifice. The armature means is operatively connected to the valve disc for positioning of the disc in its closed and open positions when the armature is in its first and second positions, respectively.

The valve body preferably forms an opening that provides fluid communication between the passage means and the exterior of the valve body, and the valve operating member includes a flexible diaphragm secured at its outer perimeter to the valve body about the perimeter of the opening. The diaphragm thereby blocks the opening. The disc includes a part of the diaphragm located interior to the outer perimeter of the diaphragm and movable between the first and second positions of the disc while the outer perimeter of the diaphragm remains stationary at the perimeter of the opening.

Conveniently, the solenoid means further includes housing means housing the armature means and mounted on the valve body, the armature means being movable in the housing means between the first and second positions, and spring means mounted in the housing means between the armature means and the housing means to bias the armature means to the first position.

As a fail-safe feature, the coil can be arranged to burn out when the rated current has flowed through the coil for at most a prohibited "on" duration, thereby preventing flow of fluid through the flow passage for a length of time greater than the prohibited "on" duration. Additionally, the flow passage can include a passage extension downstream on the valve operating means, the valve body forming a second opening that provides fluid communication between the passage extension and the exterior of the valve body. A Venturi insert means removably mounted in the passage extension can be provided to reduce the cross-sectional area of the passage means upstream of the opening, thereby increasing the velocity of fluid flowing through the passage extension and causing suction at the second opening for drawing fluid from the exterior of the valve body through the second opening to the passage extension.

The thermostat means includes a pair of contacts interposed in the circuit means. The pair of contacts is closed when the temperature of the thermostat means is less than the minimum "off" temperature, thereby permitting current to flow through the pair of contacts and the coil. The contacts are open when the temperature of the thermostat means is greater than the maximum "on" temperature, thereby preventing current flow through the pair of contacts and the coil.

BRIEF DESCRIPTION OF THE DRAWINGS

These and further features and advantages of the present invention are described in connection with the attached drawings, in which.

DETAILED DESCRIPTION OF THE PREFERRED EMBODIMENT

Figure 1:
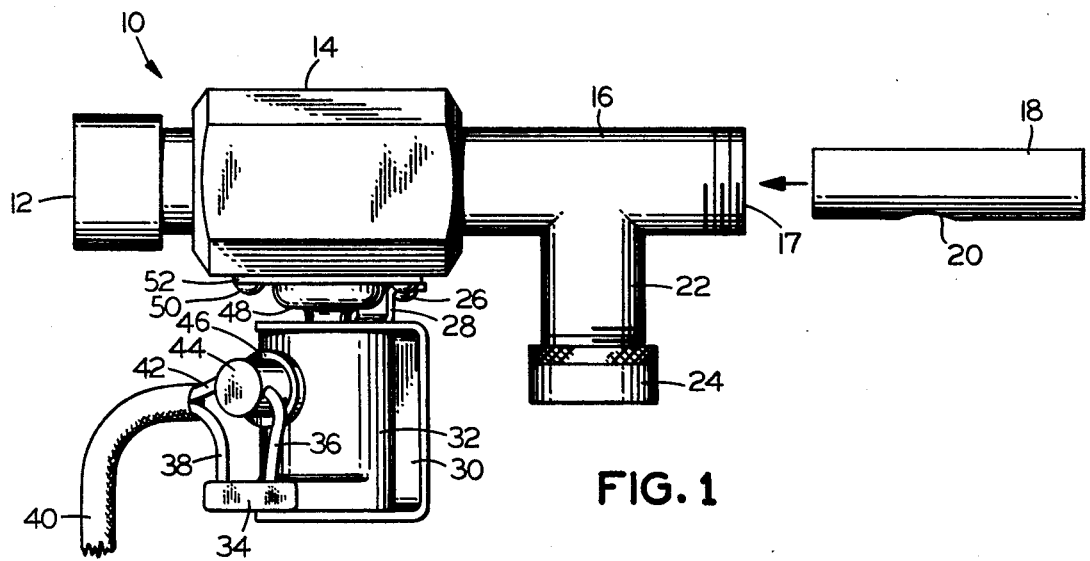
FIG. 1 is a vertical elevation of the automatic control valve of the present invention and a Venturi insert that may be used with it.

The automatic control valve of the present invention, indicated generally by reference numeral 10, includes a valve body 14 having a T section that includes a vertical section 22 and a horizontal section 16. Section 16 terminates in an outlet 17, while the vertical section 22 terminates in a cap 24 that is connected to it. The valve body 14 includes an inlet portion 12 shown to the left of FIG. 1. Fluid communication is provided between the inlet 12 and the outlet 17 by passage means described below.

A solenoid including a solenoid housing 32 and a handle 30 is provided with a bracket 28 on its upper surface that is fastened to the valve body by means of a bolt 26 that extends through a fastening plate 52 and engages the valve body 14. At its lower end and to the right in FIG. 1, the solenoid housing 32 extends into a hollow tongue 34 that is penetrated by leads 36 and 38. The leads extend through the hollow interior of the tongue 34 to either end of a coil mounted inside the housing 32. One of the leads 36 is electrically connected to a thermostat assembly 44 that is mounted on the solenoid housing 32 fitting snugly in a seal 46. The thermostat assembly 44 includes a thermostat electrically interposed between leads 36 and 42. Lead 42 joins lead 38 in a cable 40, which is suitably terminated by means not shown for the application of voltage to the solenoid. Application of a potential difference across leads 38 and 42 causes current to flow through lead 38, the coil, lead 36, the thermostat, and back through lead 42 when the thermostat switch is closed.

Figure 2:
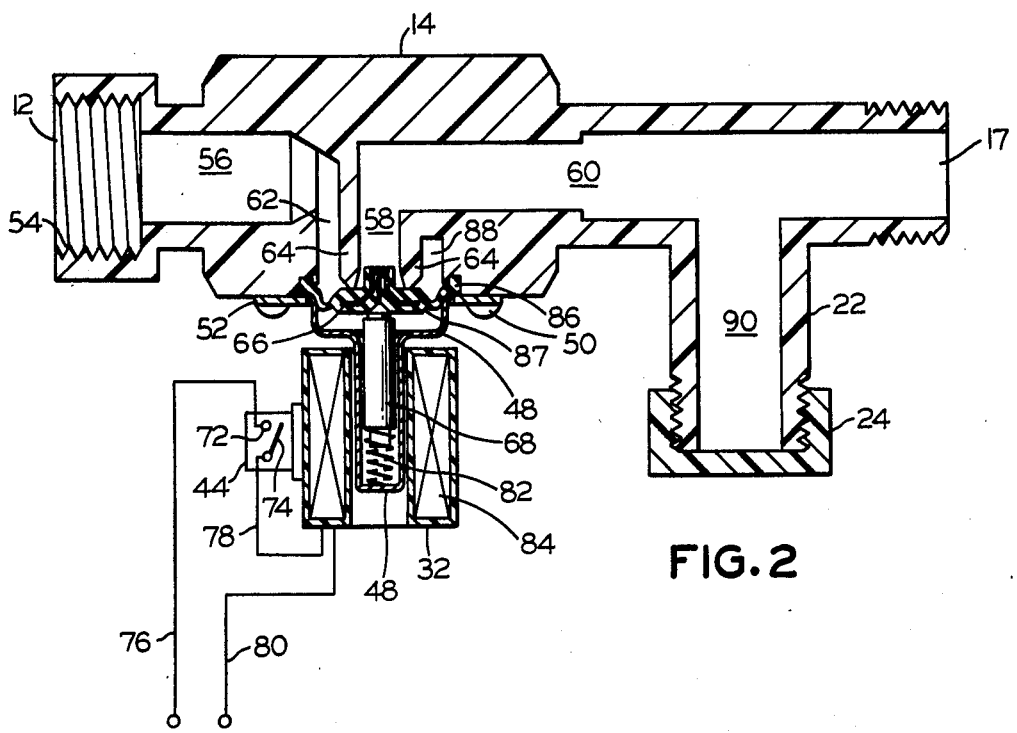
FIG. 2 is a somewhat simplified cross-sectional view of the automatic control valve of FIG. 1.

As can be seen most clearly in FIG. 2, an armature housing 48 is secured to the valve body 14 by plate 52, which has a hole in its center to receive the armature housing 48. The interior of the automatic control valve 10 is shown in FIG. 2, in which the inlet region 12 is shown as being internally threaded and communicating with a first portion 56 of the internal passage means of the automatic control valve. The passage portion 56 continues into a generally annular passage region 62 oriented vertically within the valve body 14. The vertical annular region 62 is also indicated by reference numeral 88, which indicates the right-hand portion of the cross section of the vertical annular region 62. The inner surface of the vertical annular region 62 is defined by a downwardly projecting flange 64 formed in the valve body 14.

A vertical passage region 58 is located interior to the downwardly extending flange 64 and communicates with a horizontal continuation 60 of the passage means. In order to flow from the portion 56 to the portion 60 of the passage means, it is necessary for fluid to flow through the circular orifice that is bounded by the lower edge of the downwardly projecting flange 64. As shown in FIG. 2, this flow is prevented by a valve operating member that comprises a diaphragm 87 whose shoulders abut the lower edge of the downwardly projecting flange 64 to prevent the passage of fluid from the vertical annular space 62 to the vertical space 58. The circumferential rim 86 of the diaphragm 87 is secured in a counterbore of the valve body 14 by an annular flange that forms the upper edge of the armature housing 48. Thus, the outer perimeter of the diaphragm 87 is held stationary at the perimeter of the opening in which the housing 48 is mounted. The diaphragm is stiffened interiorly to form a valve disc by an inverted-funnel-shaped brass member 66 embedded in it, and the lower edge of the downwardly projecting flange provides a seating surface for the valve disc. The diaphragm 87 is provided with an upwardly projecting circular portion that is receivable in the vertical passage 58 when the diaphragm 87 occupies the closed position shown in FIG. 2. At the center of the diaphragm there is provided a passage penetrating the diaphragm 87 and having a relatively small diameter. On its lower side the diaphragm forms a cone-shaped recess. The apex of the cone-shaped recess is aligned with the axis of the passage formed through the diaphragm 87.

The armature housing 48 is generally cylindrical in shape, having one end closed and the other, widened end open. The armature housing 48 serves as an enclosure for an armature 68 and a bias spring 82 that is mounted on the lower end of the armature housing 48 and presses against the lower end of the armature 68 to bias it in an upward position. The armature 68 has its upper end formed in a cone shape so as to substantially conform to the cone-shaped recess of the diaphragm 87 for reception in it.

Figure 3:
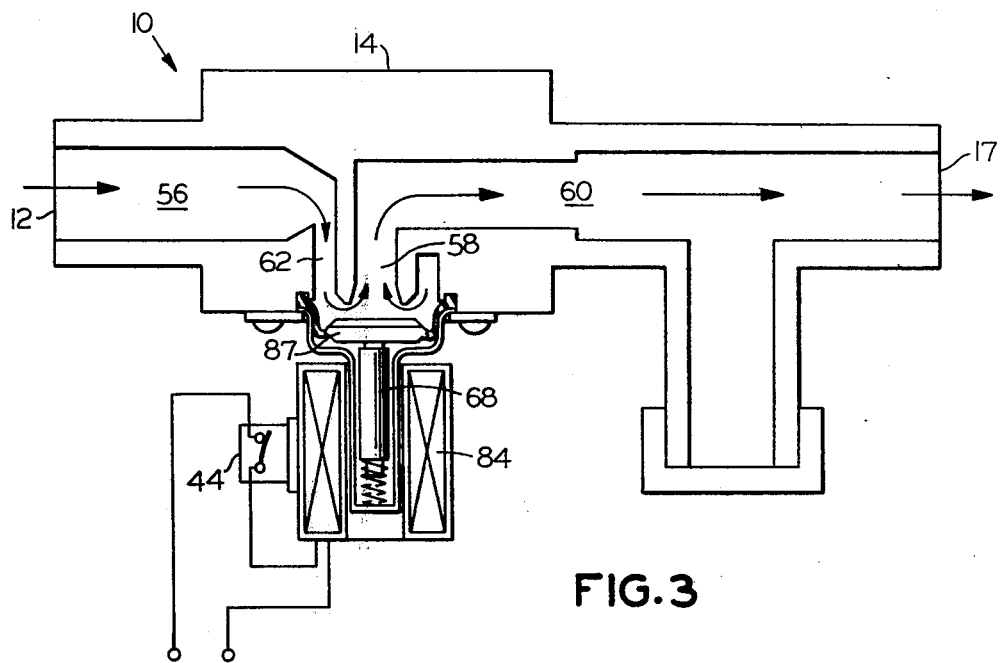
FIG. 3 is a simplified view of the automatic control valve in its open position.

The armature 68 is supported within the armature housing 48 so as to be movable between the position shown in FIG. 2 and a second position, in which it is held against the bias force from bias spring 82 by the action of the magnetic field provided by a coil 84 surrounding the armature. In the first position, shown in FIG. 2, the armature 68 holds the diaphragm in the opening formed at the bottom of the downwardly projecting flange 64 so as to block the passage formed by portions 56, 62, 58, and 60. In its second position, shown in FIG. 3, the diaphragm 87 permits flow through the passage because it is spaced from the opening formed by the flange 64.

As FIG. 2 shows, the solenoid housing 32 encloses a coil 84 that is shown schematically in FIG. 2. The coil 84 surrounds the armature 68.

Leads 78 and 80 that lead from the coil 84 correspond to leads 36 and 38 of FIG. 1. These are the two electrical ends of the coil 84. Lead 78 is attached to one of the thermostat contacts 74, while a third lead 76 leads from the other thermostat contact 72.

Those familiar with thermostats will appreciate that the thermostat is a switch whose contacts are open in one range of temperatures and closed in another. According to the present invention, temperatures above a maximum "on" temperature will cause the contacts to remain open and prevent a flow of current through the coil 84 in response to a potential difference impressed across the ends of leads 76 and 80. Below a minimum "off" temperature the contacts will remain closed to allow current to flow through the coil.

The design of the solenoid is such that application of "house current" (that is, standard domestic voltage) to the coil causes a rated current to flow through the coil. This rated current exceeds the amount needed to move the armature to its second position against the bias applied by bias spring 82. The diaphragm 87 is therefore shifted into the position shown in FIG. 3, in which the orifice formed by downwardly projecting flange 64 is not blocked. Fluid communication is therefore permitted between passage portions 62 and 58 to allow liquid to flow from the inlet 12 to the outlet 17.

In operation, a suitable connector such as a male end of a garden hose is threadedly connected to the inlet 12 of the device, and another appropriate connector is applied to the outlet to lead to a water distributing device such as a sprinkler. A plug (not shown) in which cable 40 terminates is plugged into an electrical outlet, thereby applying voltage across the leads 42 and 38, which are represented in FIG. 2 by leads 76 and 80. Initially, the thermostat is in the closed position shown in FIG. 2, but the armature 68 is biased to the position shown in FIG. 3 before power is applied. When current begins to flow through coil 84, however, the resultant magnetic field attracts the armature 68, which is pulled against the force from bias spring 82 to its second position. When this happens, the water pressure in the annular space 62 causes the diaphragm to move away from the opening at the bottom of the vertical passage 58, the small-diameter opening in the center of the diaphragm permitting air to flow from the interior of the armature housing 48 for pressure equalization. With the diaphragm 87 no longer blocking the orifice, a flow of water is permitted from the inlet 12 of the valve means to the outlet 17. Due to the presence of the cap 24 on the vertical part of the T section, water cannot escape from the vertical passage 90 through its lower end, so the flow is from inlet 12 to outlet 17.

The resistance of coil 84 is such that a substantial amount of heat is liberated when a current flows through coil 84 that is sufficient to hold the armature in its second position. The thermostat 44 is arranged in close proximity to the coil for thermal communication between the coil 84 and the thermostat 44. That is, heat is effectively transferred from the coil to the thermostat. The result is that the thermostat 44 heats up in a relatively short time to a temperature at which the thermostat opens and interrupts the flow of current to the solenoid. This deenergizes the solenoid and permits the bias spring 82 to move the armature 68 back to its first position, in which it blocks the orifice at the base of the downwardly extending flange 64. The flow of water through the passage means comprising portions 56, 62, 58, and 60 is thereby stopped.

In addition to permitting the collapse of the magnetic field that holds the armature 68 against the bias spring 82, the interruption of current through the coil 84 stops the resistive dissipation in the coil, and this allows the coil to cool down. The cooling of the coil 84 ultimately also permits cooling of the thermostat to a temperature below the minimum at which the thermostat contacts close. When terminals 72 and 74 are reconnected, the solenoid is energized as before to again permit water to flow through the passage means that includes portions 56, 62, 58, and 60.

Those skilled in the art will recognize that the cycle time and duty cycle of such a device can be selected through proper selection of the solenoid, the thermostat, and the thermal connection between them. For example, the cycle time could be 5 minutes with an on-time of one minute to result in a duty cycle of 20%. Of course, ambient temperatures would have an effect on the cycle time and duty cycle, but the device would normally be used in a rather limited range of ambient temperatures, so the desired watering conditions could be achieved to a reasonable approximation.

In the preferred embodiment of the present invention, the coil 84 is so chosen that it will burn out if it is energized continuously for any extended period of time such as, say, fifteen minutes. There would typically be a prohibited "on" duration at which the coil would burn out at the lowest expected ambient temperature, the time required for burnout being somewhat less at higher ambient temperatures. This is a particularly advantageous feature since it is normally quite a bit less desirable to have one day's overwatering than it is to have one day's underwatering. If the thermostat should malfunction so as to stay closed, overwatering would not result because the coil would be continuously energized for a time period long enough to burn it out so as to return the armature to the first position in which it causes the diaphragm to block the opening at the base of the downwardly extending flange 64. As a result, harmful overwatering is avoided.

In view of the foregoing discussion, it can be seen that the coil 84 is used to significant advantage by being provided in such a manner as to provide several functions in a single element. The first function, of course, is to provide the force for the unblocking of the fluid passage. The second function is to provide a time base for the cycle time and the duty cycle by heating up during its energized period. Its third function is to act as a failsafe mechanism, burning out if there is a defect that would otherwise cause overwatering.

Figure 4:
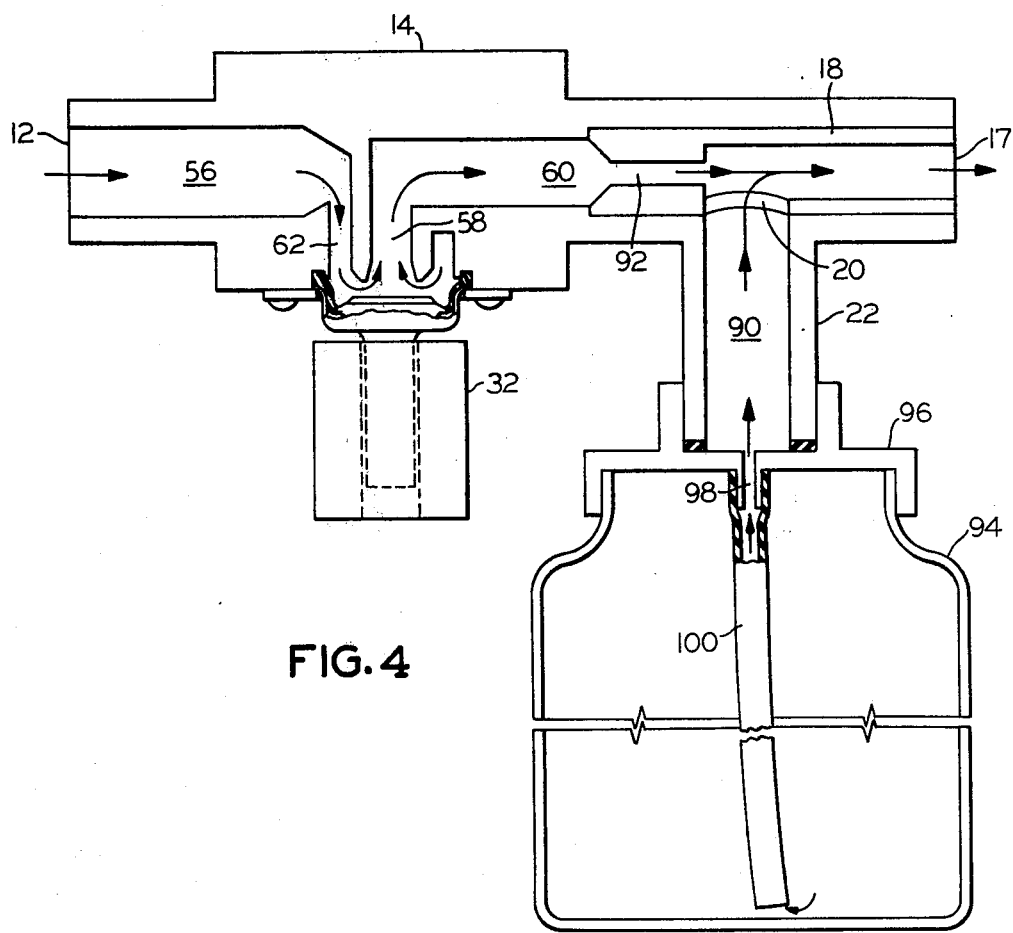
FIG. 4 is a simplified view similar to FIG. 3 showing a Venturi insert in place for use of the automatic control valve as an applicator.

Among the advantages of the device described above is its simplicity and low cost, factors which are contributed to substantially by the use of the solenoid coil 84 for several functions. This multi-function characteristic of the device is carried further by the arrangement of the T section, which includes horizontal section 16 and vertical section 22. This T section is provided so as to permit it to receive a Venturi insert 18 (FIG. 1) that has an orifice 20. Orifice 20 registers with the upper opening of the vertical passage 90 (FIG. 2) when it is inserted in the horizontal passage 60. The purpose of the insert, as is seen in FIG. 4, is to provide a passage portion 92 of reduced diameter at the right end of passage portion 60. The Venturi insert 18 is meant for use when the cap 24 is removed and a vessel 94 is included. Vessel 94 is sealed with a top 96 that is adapted for sealing engagement with the vertical section 22. The top 96 has an opening 98 in its center aligned with the entrance to the vertical section 22 for communication between the interior of the vessel 94 and the interior portion 90 of the vertical section 22. A tube 100 is provided to lead from the opening 98 to a point near the bottom of the vessel. The tube 100 is sealed to the vessel top 96 so that fluid most pass through the tube 100 in order to flow from the vessel 94 interior to the interior 90 of the vertical section 22.

When the device is arranged as shown in FIG. 4, flow of fluid through the main passage that includes portions 56, 62, 58, and 60 will also result in flow through the narrow portion 92 to the outlet 17. As is apparent, forcing the fluid to flow through the narrow portion 92 greatly increases its velocity, which reduces the pressure downstream of the portion 92 by well-known principles to provide suction to the interior 90 of the vertical section 22. This draws fluid from the interior of the vessel 94, causing the fluid to flow up through tube 100, opening 98, passage 90, and orifice 20 to join the main flow of fluid in the horizontal direction out the outlet 17. Thus, the area being watered or irrigated can, for instance, be fertilized at the same time if the vessel 94 contains liquid fertilizer.

Operation of the device with the Venturi section can be performed substantially as described above, with the solenoid-thermostat combination providing an on-and-off sequence to afford the desired amount of watering. Alternately, the coil/thermostat assembly could be replaced by a permanent magnet having a shape similar to that of the coil housing 32 to keep the passage open for manual operation. Thus, the effective cost of the device is still further reduced because it is easily adapted for manual application of fertilizer or insecticide, thus avoiding the need to purchase other equipment.

Having thus described the invention, I claim:

1. An automatically operated control valve comprising:

a. a valve body including an inlet, an outlet and a flow passage providing fluid communication between said inlet and said outlet;
   b. a valve operating member movably supported in said flow passage of said valve body for movement between an open position in which fluid is permitted to flow from said inlet to said outlet and a closed position in which fluid is prevented from flowing from said inlet to said outlet;
   c. solenoid means mounted on said valve body and including:
      (i) armature means movable between a first position and a second position and operatively connected to said valve operating member for movement of said valve operating member between its closed and open positions when said armature means is operated between its first and second positions, respectively, said armature means being biased to said first position; and
      (ii) coil means adjacent said armature means and operable, upon current flowing therethrough in response to a potential difference applied thereacross, to produce a magnetic field, said armature means being maintained in its second position by said magnetic field when a rated current flows through said coil, said valve operating member thereby being maintained in said open position when said rated current flows through said coil means and being maintained in said closed position when no current flows through said coil means, said coil means being arranged to burn out when current sufficient to maintain said armature means in said second position has flowed through said coil means for at most a prohibited "on" duration and thereby prevent flow of fluid through said flow passage for a length of time greater than said prohibited "on" duration;
   d. electric circuit means adapted for application of a potential difference thereacross and electrically connected to said coil means for application of the potential difference across said coil means sufficient to cause the rated current to flow through said coil means; and
   e. thermostat means electrically interposed in said circuit means to permit the application to said coil of potential difference applied across said circuit means when the temperature of said thermostat means is less than a predetermined minimum "off" temperature and to prevent the application across said coil means of potential difference applied across said circuit means when the temperature of said thermostat means exceeds a predetermined maximum "on" temperature, said coil means being arranged in thermal communication with said thermostat means, the flow of current through said coil generating heat transferred to said thermostat means until it reaches a temperature that exceeds the maximum "on" temperature and said thermostat opens to prevent the application of said potential difference across said coil means, said thermostat means, upon cooling below said minimum "on" temperature when no current is flowing through said coil, closing to permit application of the potential difference across said coil means.

2. The automatic control valve of claim 1 wherein said valve body includes a valve seat in said flow passage that bounds an orifice through which fluid in said flow passage must flow to pass from said inlet to said outlet, and wherein said valve operating member includes a valve disc having a seating surface shaped for seating on said valve seat and movable between a closed position in which it seats on said valve seat, thereby blocking said orifice and preventing flow of fluid therethrough, and an open position in which it is spaced from said valve seat, thereby permitting flow of fluid through said orifice, said armature means being operatively connected to said valve disc for positioning of said disc in its closed and open positions when said armature is in its first and second positions, respectively.

3. The automatic control valve of claim 2 wherein said valve body forms an opening that provides fluid communication between said passage means and the exterior of said valve body, and wherein said valve operating member includes a flexible diaphragm secured at its outer perimeter to said valve body about the perimeter of said opening, said diaphragm thereby blocking said opening, said disc including a part of said diaphragm located interior to the outer perimeter of said diaphragm and movable between said first and second positions of said disc while said outer perimeter of said diaphragm remains stationary at the perimeter of said opening.

4. The automatic control valve of claim 3 wherein said solenoid means further includes:
 a. housing means housing said armature means and mounted on said valve body, said armature means being movable in said housing means between said first position and said second position; and
 b. spring means mounted in said housing means between said armature means and said housing means to bias said armature means to said first position.

5. The automatic control valve of claim 1, 2, 3, or 4 wherein said flow passage includes a passage extension downstream of said valve operating means, said valve body forming a second opening that provides fluid communication between said passage extension and the exterior of said valve body, said automatic control valve further including Venturi insert means removably mounted in said passage extension, said insert means reducing the cross sectional area of said passage means upstream of said opening, thereby increasing the velocity of fluid flowing through said passage extension and causing suction at said second opening for drawing fluid from the exterior of said valve body through said second opening to said passage extension.

6. The automatic control valve of claim 1 wherein said flow passage includes a passage extension downstream of said valve operating means, said valve body forming a second opening that provides fluid communication between said passage extension and the exterior of said valve body, said automatic control valve further including Venturi insert means removably mounted in said passage extension, said insert means reducing the cross sectional area of said passage means upstream of said opening, thereby increasing the velocity of fluid flowing through said passage extension and causing suction at said second opening for drawing fluid from the exterior of said valve body through said second opening to said passage extension.

7. The automatic control valve of claim 1 wherein said thermostat means includes a pair of contacts interposed in said circuit means, said pair of contacts being closed when the temperature of said thermostat means is less than said minimum "off" temperature, thereby permitting current to flow through said pair of contacts and said coil, said pair of contacts being open when the temperature of said thermostat means is greater than said maximum "on" temperature, thereby preventing current flow through said pair of contacts and said coil.

8. The automatic control valve of claim 1 wherein said solenoid means further includes:
 a. housing means housing said armature means and mounted on said valve body, said armature means being movable in said housing means between said first position and said second position; and
 b. spring means mounted in said housing means between said armature means and said housing means to bias said armature means to said first position.

* * * * *